United States Patent [19]

Duncum et al.

[11] Patent Number: 5,331,105

[45] Date of Patent: Jul. 19, 1994

[54] METHOD FOR INHIBITING HYDRATE FORMATION

[75] Inventors: Simon N. Duncum, Middlesex; Antony R. Edwards; Christopher G. Osborne, both of Surrey, all of United Kingdom

[73] Assignee: The British Petroleum Company p.l.c., London, England

[21] Appl. No.: 955,071

[22] Filed: Oct. 1, 1992

[30] Foreign Application Priority Data

Oct. 10, 1991 [GB] United Kingdom ............ 9121508.7

[51] Int. Cl.$^5$ ........................... C07C 7/00; C07C 7/20
[52] U.S. Cl. ........................... 585/800; 585/4; 585/899; 585/15; 585/950
[58] Field of Search ............ 585/4, 800, 899, 15, 585/950

[56] References Cited

U.S. PATENT DOCUMENTS

| | | |
|---|---|---|
| 2,697,656 | 12/1954 | Stayner . |
| 3,309,181 | 3/1967 | Berkowitz et al. . |
| 3,399,868 | 8/1983 | Richardson et al. . |
| 3,910,856 | 10/1975 | Kruka et al. ............... 585/899 |
| 3,975,167 | 8/1976 | Nierman ............... 585/899 |
| 4,356,095 | 10/1982 | Levitt . |
| 4,973,775 | 11/1990 | Sugler et al. . |

FOREIGN PATENT DOCUMENTS 0323775  7/1989  European Pat. Off. ............ 585/899

OTHER PUBLICATIONS

"Antistatic Treatment of Combustible Organic Liquids", Chemical Abstracts, vol. 79, No. 3, Aug. 13, 1973, Columbus, Ohio Abstract No. 33437g, Marumo, Hideo.

Marumo, Hideo, "Preventing Electric Charge Formation in Combustible Organic Fluids", Abstract No. 87673t, Chemical Abstracts, vol. 87, No. 12, Sep. 19, 1977, Columbus, Ohio.

*Primary Examiner*—Anthony McFarlane
*Attorney, Agent, or Firm*—D. J. Untener; B. L. Mehosky

[57] ABSTRACT

A method for inhibiting or retarding gas hydrate formation comprises adding a solution of a compound of formula:

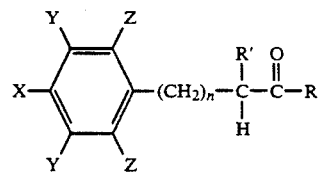

wherein
R=OH, OCH$_3$, OC$_2$H$_5$, NHNH$_2$ or H
R'=NH$_2$ or NH$_3$+
X,Y,Z=H or OH, and
n=a number in the range 0 to 6, or a polymer thereof when R'=NH$_2$, the compound or polymer thereof being added in an amount effective to inhibit or retard hydrate formation, to a medium susceptible to gas hydrate formation, e.g. fluids produced from an oil well, particularly an offshore oil well.

12 Claims, No Drawings

METHOD FOR INHIBITING HYDRATE FORMATION

The present invention relates to a method for inhibiting the formation of hydrates, in particular to a method for inhibiting the formation of hydrates in the petroleum and natural gas industries.

Hydrates are formed of two components, water or water containing dissolved solids, and certain gas molecules such as those found in natural gas. These 'gas' hydrates, commonly abbreviated to 'hydrates', will form under certain conditions, i.e. when the water is in the presence of the gas and when conditions of high pressure and low temperature reach respective threshold values. The gas may be in the free state or dissolved in a liquid, for example a liquid hydrocarbon.

The formation of such hydrates can cause problems in the petroleum and natural gas industries.

Hydrate formation in the field may cause blocked pipelines, valves and other process equipment.

The problem is particularly of concern as natural gas and gas condensate resources are discovered where operating conditions surpass these threshold values, i.e. in deep cold water and on-shore in colder climates.

Hydrates can also form in association with a crude oil reservoir thus impeding production by blockage of reservoir pores, and in association with black oils.

The problem of hydrate formation is, however, commonest during gas transportation and processing, the solid hydrate precipitating from moist gas mixtures. This is particularly true with natural gas which when extracted from a well is normally saturated with water. Often in such a case, in a cold climate, hydrates will form in downstream transportation networks and this can cause large pressure drops throughout the system and reduce or stop the flow of natural gas.

Hydrate formation may also occur during natural gas cryogenic liquifaction and separation.

A typical situation where hydrate formation can occur is in offshore operations where produced fluids are transported in a long vertical pipeline, for example, a riser system. Such produced fluids normally include light gases known to form hydrates and water. In such a situation a temperature of 4.5° C. and a pressure of 150 psi would be sufficient for hydrate formation.

Several methods are known to prevent hydrate formation and subsequent problems in pipelines, valves and other processing equipment.

Physical methods have been used, e.g. increasing gas temperature in the pipeline, drying the gas before introduction into the pipeline, or lowering the gas pressure in the system. However these techniques are either expensive or are undesirable because of loss of efficiency and production.

Chemical procedures have also been used. Electrolytes, for example, ammonia, aqueous sodium chloride, brines and aqueous sugar solutions may be added to the system.

Alternatively, the addition of methanol or other polar organic substances, for example, ethylene glycol or other glycols may be used. Methanol injection has been widely used to inhibit hydrate formation. However, it is only effective if a sufficiently high concentration is present since at low concentration there is the problem of facilitation of hydrate formation. Also, for methanol to be used economically under cold environmental conditions, there must be early separation and expulsion of free water from the well in order to minimise methanol losses in the water phase.

In many cases chemicals have been used to primarily retard the formation of hydrates rather than to inhibit or prevent their formation.

We have now found that certain tyrosine derivatives may be used as effective hydrate inhibitors at low concentration.

Thus according to the present invention there is provided a method for inhibiting or retarding hydrate formation which method comprises adding a solution of a compound of formula:

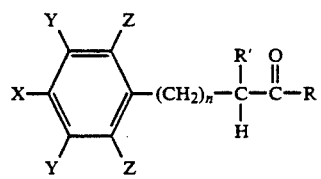

wherein
R=OH, OCH$_3$, OC$_2$H$_5$, NHNH$_2$ or H
R'=NH$_2$ or NH$_3$+
X,Y,Z=H or OH, and
n=a number in the range 0 to 6,
or a polymer thereof when R'=NH$_2$,
the compound or polymer thereof being added in an amount effective to inhibit or retard hydrate formation, to a medium susceptible to hydrate formation.

The compound may be of formula:

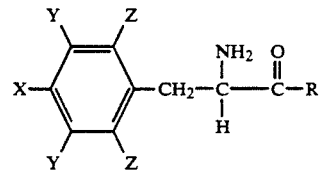

Preferred compounds suitable for use in the method of the present invention are those wherein X=OH and Y, Z=H.

Particularly preferred compounds are L-tyrosine and L-tyrosine methyl ester.

The inhibitors of the present invention are suitable for use in media containing water and gas, in particular in the petroleum, natural gas and gas industries.

In particular they may be suitable for use during the transportation of fluids comprising gas and water. They may also be suitable for use in drilling muds to inhibit hydrate formation during drilling operations.

The inhibitors of the present invention are suitably employed in aqueous solution, for example, as a solution in brine or an alcohol, for example methanol.

They are suitably added to give concentrations in the range 10 to 1000 ppm, in particular concentrations in the range 50 to 400 ppm.

The inhibitors may be employed at normal ambient conditions of temperature and pressure.

When used during the transportation of fluids the inhibitors may be injected continuously into the pipeline upstream of conditions wherein hydrate formation may occur.

In drilling operations the inhibitors may be added to the drilling muds in the mud tank at the wellhead.

The hydrate inhibitors of the present invention may be used alone or as part of a mixture with other conventional hydrate inhibitors and/or other suitable chemicals, for example, corrosion inhibitors or water dispersants.

The method of the present invention is illustrated with reference to the following Examples 1-6, of which Example 1 is for purpose of comparison only.

EXAMPLES

To assess the efficiency of hydrate inhibitors suitable for use in the method of the present invention, tests were carried out using the following procedure: A known volume of deionised water was placed into a pressure cell. The cell was placed into a water-glycol temperature bath to control the sample temperature to 2° C. The lid which sealed the pressure cell contained a thermocouple to monitor sample temperature, an injection line to allow gas into or out of the cell and another outlet leading to a relief valve. The lid also contained a steel tube holding an optic fibre probe terminating at a sapphire window and facing a polished steel mirror set at a large gap from the window. The other end of the probe was connected to the receiver-transmitter set of an amplifier/control box. The water sample was kept stirred at a set rate by a magnetic stirrer upon which the pressure cell sat. Pressure transducers indicated the pressure within the cell and in the lines outside the cell.

With the water sample in the cell at temperature and the lid secured, the optic fibre probe and window-mirror assembly was racked down until the stirred water surface was just below the face of the mirror. The amplifier was turned on and the light sent down the probe was reflected back from the mirror through the window to be converted to a voltage signal which was plotted on a chart recorder. Methane gas was then bled into the cell from an external gas bottle supply, via a regulator, until the pressure in the cell was at 70 bar. The cell was then sealed off by closing a valve in the injection line.

Three signals were plotted on a chart recorder, i.e. the light transmitted across the window-mirror gap, the sample temperature and the cell pressure. The purpose of the test was to find the time of onset of hydrate formation calculated from the time when methane first entered the cell. When hydrates form, (initially at the gas-water interface) the transmitted light signal suddenly drops to a low value, there is a temperature blip (an increase of about two degrees celsius) and the pressure gradually decreases. Thus, the time from first contact of the water and gas to hydrate formation can be read from the chart recorder.

The procedure was repeated for solutions of hydrate inhibitors in deionised water.

The standard experimental conditions were as follows:

Sample Volume = 100 cc
Sample Temperature = 2° C.
Sample Pressure = 70 bar methane
Mirror-Window gap = 1 cm
Stirrer Speed = 100 rpm The results are shown in the Table which clearly shows the efficiency for hydrate inhibition of the compounds studied.

TABLE

| Example | Inhibitor | Concentration ppm | Time for hydrate formation (hours) |
|---|---|---|---|
| 1 | Dionised Water | — | 1.13 |
| 2 | L-Tyrosine | 100 | 6.46* |
|   |   | 200 | 17.0* |
|   |   | 400 | 25.67 |
| 3 | D-Tyrosine | 100 | 2.78 |
|   |   | 200 | 3.72* |
| 4 | L-Tyrosine Methyl Ester | 200 | 11.50* |
| 5 | L-Tyrosine Hydrazide | 200 | 4.5* |
| 6 | L-Phenylalanine | 200 | 14.58* |

*represents mean duration based on several test runs

We claim:

1. A method for inhibiting or retarding hydrate formation in a medium comprising water and gas susceptible to hydrate formation, which method comprises adding a compound of formula:

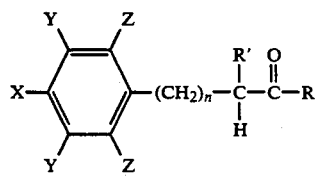

wherein
R = OH, OCH$_3$, OC$_2$H$_5$, NHNH$_2$ or H
R' = NH$_2$ or NH$_3$+
X,Y,Z = H or OH, and
n = a number in the range 0 to 6,
the compound being added in an amount effective to inhibit or retard hydrate formation.

2. A method according to claim 1 wherein the compound is of formula:

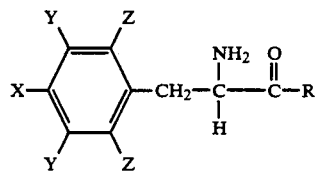

3. A method according to claim 2 wherein X=OH and Y and Z=H.

4. A method according to claim 3 wherein the compound is L-tyrosine or the methyl ester of L-tyrosine.

5. A method according to claim 1 wherein the compound is added in the form of a solution.

6. A method according to claim 5 wherein the compound is added to give a concentration in the range 10 to 1000 ppm.

7. A method according to claim 6 wherein the compound is added to give a concentration in the range 50 to 400 ppm.

8. A method according to claim 5 wherein said solution is an aqueous solution.

9. A method according to claim 5 wherein said solution is injected continuously into a pipeline upstream of conditions where hydrate formation occurs.

10. A method according to claim 5 wherein said solution further comprises at least one of a corrosion inhibitor and a water dispersant.

11. A method according to claim 9 wherein said solution further comprises at least one of a corrosion inhibitor and a water dispersant.

12. A method for inhibiting or retarding hydrate formation which method comprises adding a compound of formula:

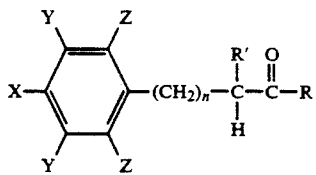

wherein
R=OH, OCH$_3$, OC$_2$H$_5$, NHNH$_2$ or H
R'=NH$_2$ or NH$_3$+
X,Y,Z=H or OH, and
n=a number in the range 0 to 6,
the compound being added in an amount effective to inhibit or retard hydrate formation, to a medium comprising water and a fluid selected from the group consisting of natural gas, of the first stage, petroleum gas petroleum gas dissolved crude petroleum, petroleum gas dissolved drilling mud, and mixtures of the same.

* * * * *

UNITED STATES PATENT AND TRADEMARK OFFICE
CERTIFICATE OF CORRECTION

PATENT NO.   : 5,331,105
DATED        : July 19, 1994
INVENTOR(S)  : Simon Neil Duncum et al It is certified that error appears in the above-identified patent and that said Letters Patent is hereby corrected as shown below:

In claim 12, column 6, line 10, delete the words "petroleum gas dissolved"

Signed and Sealed this

Twenty-seventh Day of December, 1994

Attest:

BRUCE LEHMAN

Attesting Officer            Commissioner of Patents and Trademarks